United States Patent [19]
Rising

[11] 3,854,907
[45] Dec. 17, 1974

[54] VENTED FILTER HOLDER
[75] Inventor: Donald B. Rising, Stow, Mass.
[73] Assignee: Millipore Corporation, Bedford, Mass.
[22] Filed: Dec. 10, 1973
[21] Appl. No.: 424,602

[52] U.S. Cl.................... 55/159, 55/318, 55/421, 210/436, 210/455, 210/DIG. 23
[51] Int. Cl...................... B01d 19/00, B01d 23/00
[58] Field of Search...... 55/159, 318, 421; 210/436, 210/455, DIG. 23

[56] References Cited
UNITED STATES PATENTS
| | | | |
|---|---|---|---|
| 3,295,297 | 1/1967 | Collins | 210/DIG. 23 |
| 3,361,261 | 1/1968 | Fairey et al. | 210/455 X |
| 3,631,654 | 1/1972 | Riely et al. | 55/159 |
| 3,650,093 | 3/1972 | Rosenberg | 55/159 |

Primary Examiner—Charles N. Hart
Assistant Examiner—Richard W. Burks
Attorney, Agent, or Firm—Clarence S. Lyon

[57] ABSTRACT

An improved vented microporous membrane filter holder is described which is particularly useful as a final filter in intravenous therapy. The holder includes two parts, a filter support member and a cover member, both substantially tubular in shape. The support member includes a hollow tubular member having grooves formed in its outer surface. A wettable filter is sealed to this outer surface. A closed passage connects to all of the grooves and carries filtered liquid to an outlet port formed in the base which seals one end of the hollow tubular member. The other end of the tubular member is closed with a non-wetting filter. Gas passed by this filter, after passing through the center of the tubular support member, is vented out an opening also formed in the base. A cover is sealed to the base at one end and a inlet port is formed in the other end of the cover, which surrounds the tubular support member.

11 Claims, 3 Drawing Figures

PATENTED DEC 17 1974　　　3,854,907

VENTED FILTER HOLDER

BACKGROUND OF THE INVENTION

1. Field of the Invention

This invention relates to a improved filter holder. The holder is particularly useful in the filtration of intravenous fluids as they are supplied to patients undergoing intravenous therapy. More particularly the invention relates to a holder for a microporous membrane filter adapted to separate gases and liquids while performing the filtration function.

2. Description of the Prior Art

Filter holder designs adapted to separate liquids from gases entrained therein while filtering the liquid are known. Specific designs for such filter holders are shown, for example, in U.S. Pat. No. 3,523,408 issued Aug. 11, 1970 to D. Rosenberg and in the U.S. Pat. No. 3,631,654 issued Jan. 4, 1972 to Riely et al.

The necessity for removing air from intravenous fluid before the fluid enters the vein of a patient is well known. Air bubbles which enter a vein can of course cause an air embolism with substantial danger of death to the patient. For this reason filters which perform a liquid-gas separation have found particular application in the on-line filtration of intravenous fluids i.e. filtration as the fluid is being supplied to the patient.

Recent studies have also suggested that filtration to remove small particles from intravenous fluids as they are administered may substantially reduce the incidence of phlebitis in patients undergoing intravenous therapy.

In general, in the prior constructions of gas-liquid separating filters, the liquid, containing gases entrained therein, is supplied to a chamber having two outlets, one of which is covered with filtration material which is wetted by the liquid while the other outlet is covered by material which is not wetted by the liquid. Since the pore size of the wetted filter is typically quite small, some positive pressure is required across the filter to force liquid through it. This pressure will tend to force gases entrained in the liquid through the non-wetted filter which thus acts as a gas vent. Filter holders in which the non-wetting filter and the liquid filter oppose each other are shown for example in the cited Rosenberg patent. The cited Riely et al patent illustrates filter holder constructions in which the non-wetting and wetting filters are adjacent each other. The prior constructions, such as those illustrated in the foregoing patents, in general provided a relatively large ratio of non-wetting to wetting filter, the ratio often approaching a value of 1 or even more. Additionally, the area of the wetted filter was not large in comparison to the filter holder. When as is usual, microporous filters of the screen type are used in such holders, a relatively large wettable filter area is required to prevent filter clogging when in use. This is particularly true for holders to be used in intravenous therapy, since the available pressure to force liquid through the wetted filter is relatively small, i.e., a pressure corresponding to a liquid head of 3 to 4 feet. Also, filter holders made according to the prior art were relatively bulky if they were made large enough to provide the desired wettable surface filter area and because of their bulk and their general shape they were unsuited for general use in intravenous therapy. A further problem with prior construction was cost. Because of their complex design, many of the prior units, particularly those having a generally tubular configuration as opposed to a generally disc-shaped configuration were expensive to produce. Since it is desirable that these filter units, when used for intravenous therapy, should be used only once and then disposed of, they must be relatively inexpensive to produce; thus requiring a relatively simple design.

SUMMARY OF THE INVENTION

To overcome the foregoing problems, I have provided a novel filter holder construction in which the wettable filter is wrapped about a supporting hollow cylinder having grooves formed in its outer surface. The liquid passing through the wettable filter into the grooves is conducted by a closed passage formed in the support interior to an outlet port formed in the bottom cover of the support. The end of the supporting cylinder adjacent the inlet port is closed with a non-wetting filter material and the gases by this non-wetting filter are vented through the hollow supporting cylinder and through a second opening in its bottom cover. A cover member covers the support member and forms an inlet port at the end opposite the filter support cover.

Thus the filter holder of my invention has a single inlet port at one end and parallel, but separated, outlet ports for liquids and gases at the other. The wetted filter in the holder is wrapped around the outside of an elongated hollow tube, one end of which is closed with the nonwetting vent filter. In this manner I provide in a filter holder having a relatively simple construction, a relatively large area of wettable filter, and adequate vent filter. Further, because the outlet vent opening is at one end of the filter, as opposed to being in the side thereof, the possibility of accidental blockage of the vent in use is minimized. Since the device may be tubular in form it is convenient to use and since the construction is relatively simple as compared with prior devices, it is economical to manufacture and, therefore, may be purchased, used and disposed of without significant cost.

DESCRIPTION OF THE PREFERRED EMBODIMENTS

Figures 1, 2, 3:
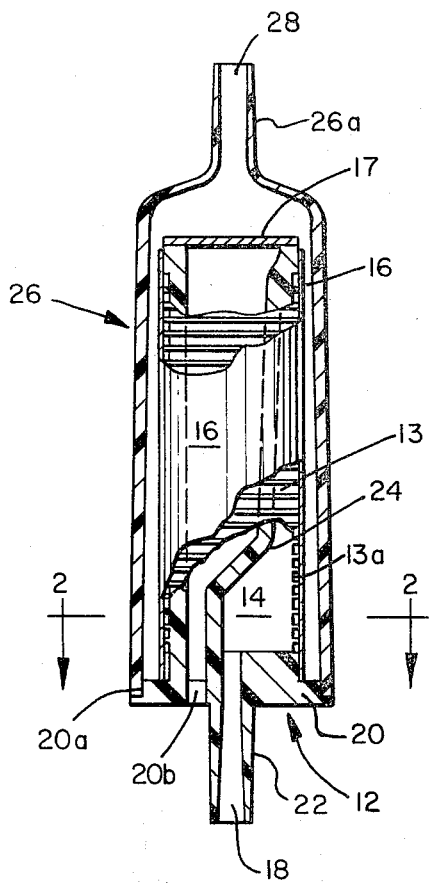
FIG. 1 is a vertical section, with parts broken away for clarity, of the filter holder of my invention.
FIG. 2 is a horizontal section taken along the line 2—2 of FIG. 1.
FIG. 3 is an alternative embodiment of the filter holder of my invention having additional locations for supplying additive fluids both prior to and subsequent to filtration.

A filter holder made in accordance with my invention is illustrated in FIGS. 1 and 2. As shown in FIGS. 1 and 2 the filter holder includes a filter support member generally indicated at 12 and including a tubular support member 13 and base 20. A liquid-wetted filter 16 is wrapped about the periphery of the hollow tubular filter support 13 and sealed thereto. The upper end of the tubular filter support is closed by the non-wetting filter material 17. The entire structure is sealed within a cover member 26, this member being preferably although not necessarily transparent. A tubular extension 26a on the upper end of the cover member forms the inlet port 28, while the outlet port 18 is formed by the tubular extension 22 extending downwardly from the base 20 of the support member 12.

The embodiment of FIGS. 1 and 2 will not be described in greater detail. The filter holder includes a support member generally indicated at 12 having an elongated hollow tubular member 13 which functions as the filter support. The grooves 13a formed in the surface of the member 13, define a series of lands 13b therebetween. As shown in FIG. 1, the grooves 13a are formed horizontally around the member 13 substantially at right angles to its longitudinal axis. However, the grooves could of course be formed at an angle to this axis. The grooves do not extend completely about the core, but are interrupted at a point around the periphery of the tubular member 13 which is approximately opposite to the location of the passage 14 to be described below. It is desirable that the lands 13b defined by the grooves 13a be closely spaced as shown and the grooves themselves be shallow so that the volume of liquid contained within the wettable filter underdrain support will likewise be low. This construction tends to prevent the formation of air bubbles in the filtered liquid.

Thus the ungrooved portion of the outer surface of support 13, which is not visible in FIG. 1, serves as a sealing surface for the wettable filter 16, as will be described more fully below.

The grooves 13a are joined by a closed passage 14 which serves to conduct liquid passed by the membrane filter 16 wrapped about the core to the grooves 13a from the grooves to the outlet port 18 formed in the base 20 of the support member. The outlet port 18 is formed by the tubular extension 22 formed at the center of the base 20 of the support member. It will be observed that the passage 14, which joins the grooves 13a is defined and closed by the passage wall 24. The passage wall 24 is integrally formed as part of the support member 12 and separates the passage 14 from the remainder of the interior of the hollow support member 12. The base 20 of the support member 12 is preferably, although not necessarily, integrally formed with the tubular support member 13. A shoulder 20a is formed about the periphery of the base to receive and support the bottom edge of the cover member 26 thereon. A vent opening 20b is formed in the base member 20 to provide a passage for fluid passed by the non-wetting filter 17 through the center of the hollow support member to the exterior of the filter holder.

The liquid wettable filter material is preferably a microporous membrane filter made of mixed esters of cellulose. This material is available in a wide range of pore sizes and the particular pore size depends upon the particular use for which the unit is designed. For use in intravenous therapy I have found that mean pore sizes in the range 0.45 micrometers and 0.22 micrometers are preferred. Liquid wettable filter material of the foregoing description is available from the Millipore Corporation, Bedford, Massachusetts, U.S.A. as its grades HA and GS respectively.

The non-wettable filter material may be one of the foregoing materials which has been chemically treated to render it non-wettable. However, I prefer to use a filter made of polytetrafluoroethylene which is inherently non-wettable. For use in intravenous filter holders made according to the invention I have used a microporous polytetrafluoroethylene filter having a pore size of 0.2 micrometers. Filters of this material are also available from Millipore Corporation at the address specified above. These filters are sold by Millipore Corporation under the trade mark "Fluoropore" and the grade having an average pore size of 0.2 micrometers is its FG grade.

The filter support member 12 is preferably molded of polyvinyl-chloride-propylene copolymer. This permits both the wettable and non-wettable filters to be heat sealed directly to the tubular support member in the locations shown. Heat sealing of the filter material might also be accomplished if the core was molded of polypropylene.

If the support member is made of a plastic or of metal so that heat sealing is not possible, the filter materials may be bonded to the support member 13 with solvents or adhesives as appropriate.

As previously noted the cover 26 is preferably a transparent tubular member having an open lower end which seals in the shoulder 20a and which is formed with a tubular extension 26a at its upper end to provide the inlet port 25. The cover may be made of transparent polyvinylchloride or other suitable material. Preferably the cover is secured to the base by ultrasonic welding although it may be attached using solvent or adhesive bonding if desired.

As noted above, the filter holder of my invention is particularly useful in connection with intravenous therapy. In a representative embodiment in which the tubular support member was approximately 1 ½ inches in length and with an outside diameter of about 7/32 inches, the total active filter area was about 1.56 square inches (10 square centimeters). The widest diameter of the unit was about ⅝ inches (1.6 centimeters). The total length of the unit was 1 ¾ inches, (4.45 centimeters) not including the extensions 22 and 26a for tubing attachment.

If a wetted filter in the form of a disc were used, to provide the same surface area, the entire filter holder would be about 2 inches (5.1 centimeters) in diameter and would be approximately (⅜) inch (1 centimeter) in length.

It is apparent that the form of filter holders made according to my invention is much more convenient to the user and less likely to be dislodged by patients when in use than the flat circular construction heretofore available. It will also be apparent that the construction illustrated protects the non-wetting filter material from inadvertent puncture by needles or the like, since this filter can be reached only by inserting a needle through a relatively long passage.

In use the inlet port is connected to a supply of liquid to be filtered, which may be an intravenous fluid. The liquid enters the port 28 and partially fills the space between the cover 26 and the filter 16. Any gas bubbles in the system will not readily pass through the wetted membrane 16, but such gas may escape through the non-wetting filter 17 and pass downwardly through the hollow center of the filter support to vent through the opening 20b. The liquid passes through the filter 16 and into the grooves 13a. This filtered liquid flows around the grooves to the collection passage 14 formed in the filter support 13 and then flows by gravity downwardly through the passage 14 to the outlet port 18, and then through external tubing (not shown) to the intravenous injection site.

It will be observed that the filter unit of my invention will operate even if it is turned on its side or even beyond provided that there is sufficient pressure to cause liquid flow.

FIG. 3 illustrates an alternative embodiment of my invention which includes three ports through which therapeutic additives may be supplied to a patient undergoing intravenous therapy. Except for the additive ports, to be described, the construction of the embodiment of FIG. 3 is substantially the same as that shown in FIGS. 1 and 2.

Three ports are provided in the construction shown in FIG. 3, two in the cover member 26 and one in the support member 12. The additive ports in the cover member are formed by integrally molded side walls 30a, 30b, 32a and 32b respectively forming the passages 34 and 36 whose axis is at right angles to the axis of the filter holder. The outer end of each passage is covered, in conventional fashion with a rubber septum, the passage 34 by the septum 38 and the passage 36 by the septum 40. The needle associated with a syringe may be inserted through either of these septa and therapeutic additives introduced into the intravenous fluid entering the filter holder. Because of the direction of the longitudinal axis of passages 34 and 36, a needle inserted through their respective septa cannot reach the surface of the non-wettable filter.

In some circumstances, it may be desirable or necessary to inject a therapeutic additive to the filtrate rather than having it pass through the filter. For this purpose a third injection port is provided at the filter outlet. It is preferably formed by the bottom portion of the filter support member 12 and by the preferably integrally formed wall 42 which together define the injection passage 44. The outer end of the passage 44 is covered with a septum of rubber or the like 46 as are the passages 34 and 36 to provide an injection site. In the construction shown in FIG. 3 it may be desirable to provide a depending skirt to aid in the support of the side walls forming the injection passage. Such a skirt is illustrated at 48.

It will thus be apparent that I have provided a novel and relatively simple construction for a filter holder which is particularly adapted for use as a final filter in intravenous therapy. It is simple in construction in that both the wettable and non-wettable filters are supported on a single support member, which may be of molded plastic, and the only other required member is a cover member which forms the inlet port and which is secured to the inlet port in a simple manner. The filtrate and venting passages are both formed in the hollow center of the filter support member and therefore may be molded in place when the support member is manufactured. Because of its essentially tubular shape in contrast to prior disc shaped filters of this type it is substantially more convenient to use in the hospital environment.

I claim:

1. A vented filter holder comprising, in combination:

1. a hollow tubular support member having means forming a filter underdrain support on its surface, said support member including an opening to the interior thereof;
    2. a sheet of liquid-wettable filter material supported on the underdrain support formed on the outer surface of said tubular support member;
    3. means forming a liquid outlet port;
    4. means providing a first closed fluid path from said underdrain support to said outlet port;
    5. a non-liquid wettable filter material sealed across the opening to the interior of said hollow support member;
    6. means forming a fluid passage from the interior of said support member through said support member to the exterior of said filter holder, said passage being separated from said first closed passage; and
    7. cover means, including means forming an inlet port surrounding said support member and filter and sealed to said support member along a line but otherwise spaced therefrom.

2. The combination defined in claim 1 in which said underdrain support is formed by a plurality of circumferentially extending grooves formed in the surface of said tubular member.

3. The combination defined in claim 1 in which said opening to the interior of said tubular member is the open end of said hollow tubular member.

4. The combination defined in claim 1 in which said liquid wettable filter material is a microporous membrane.

5. The combination defined in claim 4 in which said microporous membrane is made of mixed esters of cellulose.

6. The combination defined in claim 1 in which said non-liquid wettable filter material is a microporous membrane filter.

7. The combination defined in claim 6 in which said microporous membrane filter is made of polytetrafluoroethylene.

8. The combination defined in claim 1 in which said cover means is transparent.

9. A vented filter holder comprising, in combination:

1. a hollow tubular support member having a plurality of circumferentially extending grooves formed on its outer surface to provide a filter underdrain support, said support member being open at one end and closed at the other except for gas and liquid outlet ports formed in said closed end;
    2. a microporous membrane filter sheet of liquid-wettable material supported on the underdrain support formed by said grooves on the outer surface of said tubular support member and sealed to said support member;
    3. means providing a closed liquid passage joining said grooves and leading from said grooves to the outlet port through the interior of said tubular member.
    4. a non-liquid wettable microporous material sealed across the open end of said tubular support member;
    5. means forming a passage for gases passed by said nonliquid wettable material through the interior of said support member to the gas outlet formed in said base; and
    6. cover means, including means forming an inlet port surrounding said support member and filters and sealed to said support member base along a line but otherwise spaced therefrom.

10. The combination defined in claim 9 in which said wettable microporous membrane material is made from mixed esters of cellulose.

11. The combination defined in claim 9 in which said non-wettable microporous membrane material is made from polytetrafluoroethylene.

* * * * *